United States Patent [19]

Winston

[11] Patent Number: 5,335,152
[45] Date of Patent: Aug. 2, 1994

[54] NONIMAGING OPTICAL ILLUMINATION SYSTEM

[75] Inventor: Roland Winston, Chicago, Ill.
[73] Assignee: NiOptics Corporation, Evanston, Ill.
[21] Appl. No.: 774,666
[22] Filed: Oct. 11, 1991
[51] Int. Cl.$^5$ ............................................... F21V 7/02
[52] U.S. Cl. ................................ 362/217; 362/347; 359/867
[58] Field of Search ............. 362/217, 296, 341, 347, 362/350; 250/504 R, 493.1, 503.4; 359/867, 868, 869

[56] References Cited

U.S. PATENT DOCUMENTS

| | | |
|---|---|---|
| 3,760,237 | 9/1973 | Jaffe. |
| 3,923,381 | 12/1975 | Winston .................. 359/867 |
| 3,949,318 | 4/1976 | Zeidler. |
| 4,002,499 | 1/1977 | Winston .................. 359/869 |
| 4,003,638 | 1/1977 | Winston .................. 359/867 |
| 4,045,246 | 8/1977 | Mlavsky et al. .......... 359/867 |
| 4,114,592 | 9/1978 | Winston .................. 359/867 |
| 4,130,107 | 12/1978 | Rabi et al. ............... 359/867 |
| 4,230,095 | 10/1980 | Winston .................. 359/867 |
| 4,237,332 | 12/1980 | Winston .................. 359/868 |
| 4,240,692 | 12/1980 | Winston .................. 385/146 |
| 4,327,969 | 5/1982 | Giutronich et al. ...... 362/297 |
| 4,483,007 | 11/1984 | Winston .................. 359/869 |
| 4,697,867 | 10/1987 | Blanc et al. ............. 350/96.10 |
| 4,875,750 | 10/1989 | Spaeth et al. . |
| 4,883,333 | 11/1989 | Yanez . |
| 4,898,450 | 2/1990 | Jannson ................... 350/96.12 |
| 4,912,614 | 3/1990 | Goldenberg ............. 359/867 |
| 4,922,107 | 5/1990 | Rabl et al. .............. 359/869 |
| 4,947,305 | 8/1990 | Gunter, Jr. .............. 362/347 |
| 4,956,759 | 9/1990 | Goldenberg et al. . |
| 4,962,311 | 10/1990 | Poisel et al. ............. 250/216 |
| 4,964,025 | 10/1990 | Smith ..................... 362/347 |
| 4,990,788 | 2/1991 | Rabl et al. .............. 359/869 |

FOREIGN PATENT DOCUMENTS 0100102 6/1985 Japan ................... 362/341
59176818 3/1986 Japan .

Primary Examiner—Ira S. Lazarus
Assistant Examiner—Y. Quach
Attorney, Agent, or Firm—Reinhart, Boerner, Van Deuren, Norris & Rieselbach

[57] ABSTRACT

A nonimaging illumination optical device for producing selected intensity output over an angular range. The device includes a light reflecting surface (24, 26) around a light source (22) which is disposed opposite the aperture opening of the light reflecting surface (24, 26). The light source (22) has a characteristic dimension which is small relative to one or more of the distance from the light source (22) to the light reflecting surface (24, 26) or the angle subtended by the light source (22) at the light reflecting surface (24, 26).

11 Claims, 7 Drawing Sheets

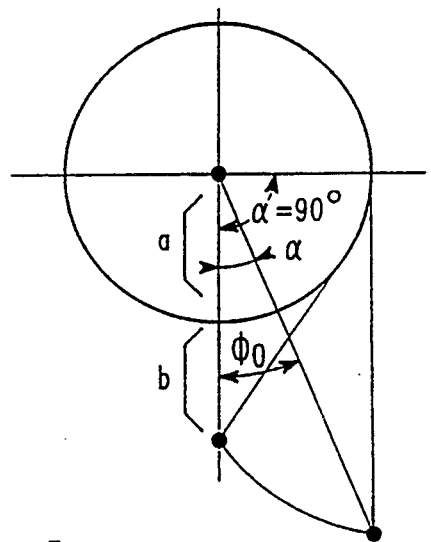
Fig. 1
P(θ) = CONSTANT
a = 0.055
b = 0.100
b = 12.36
c = 0.05136
$(\theta(\varphi) = ((\varphi - \varphi_0)))$
Fig. 3B
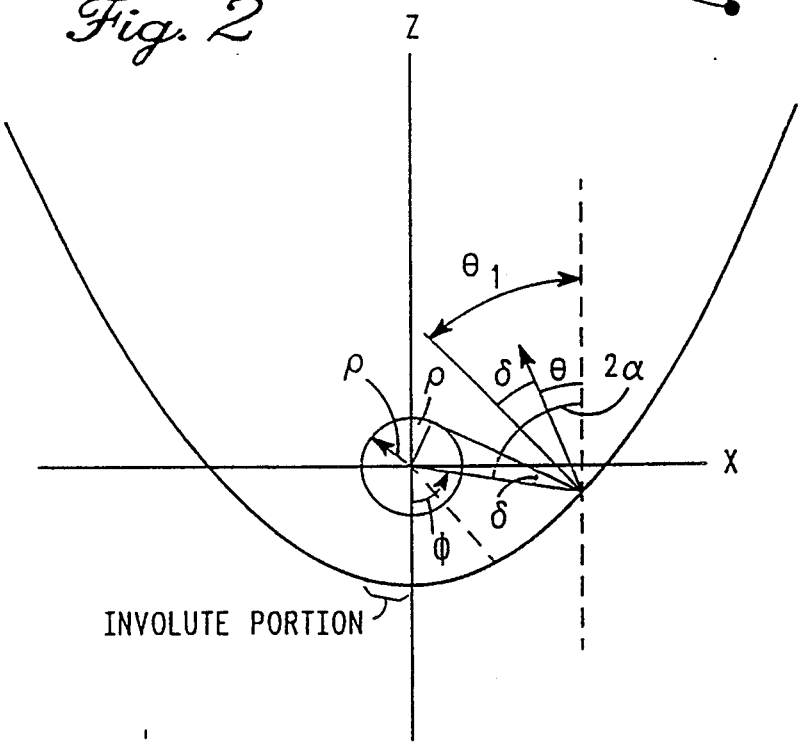
Fig. 2
INVOLUTE PORTION
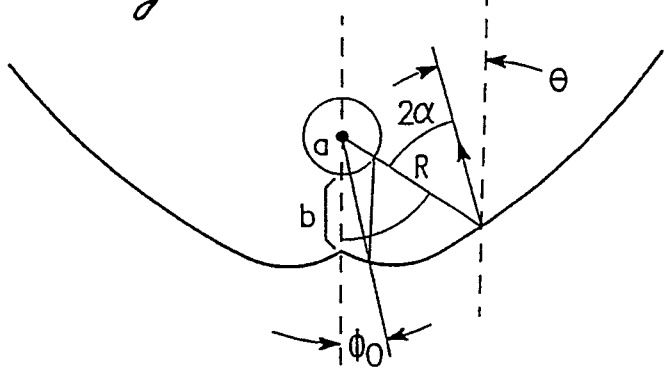
Fig. 3A

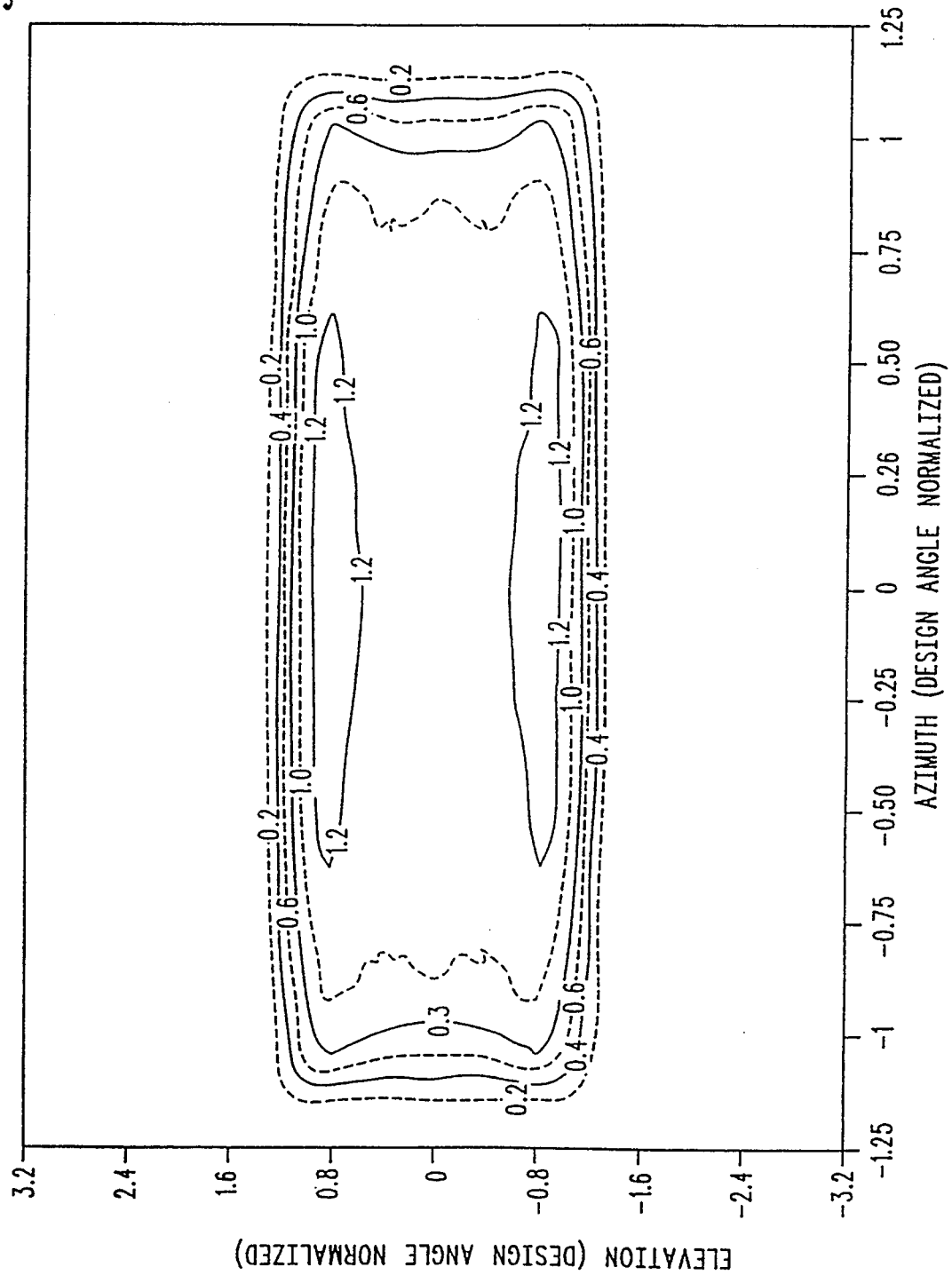

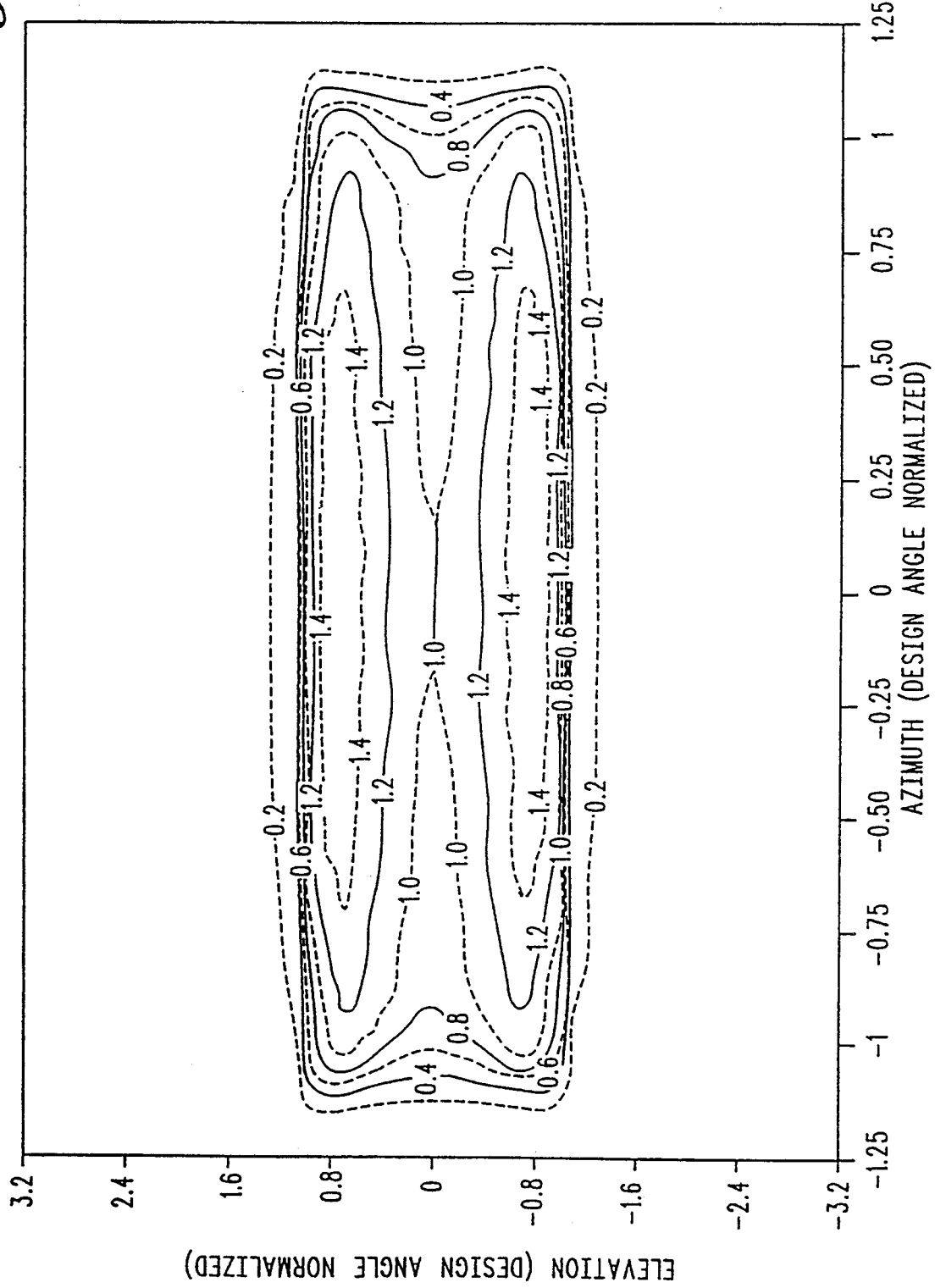

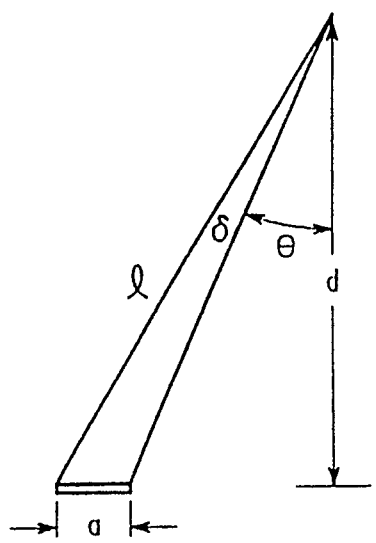
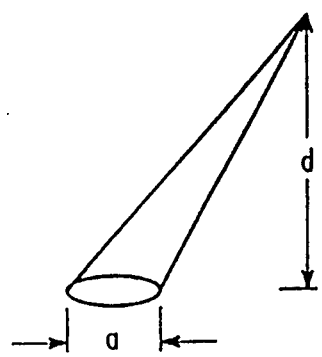
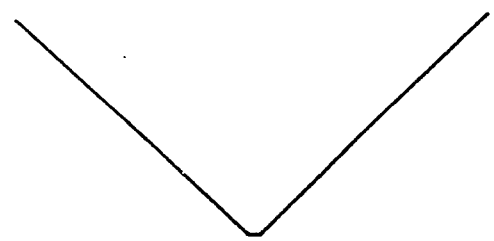
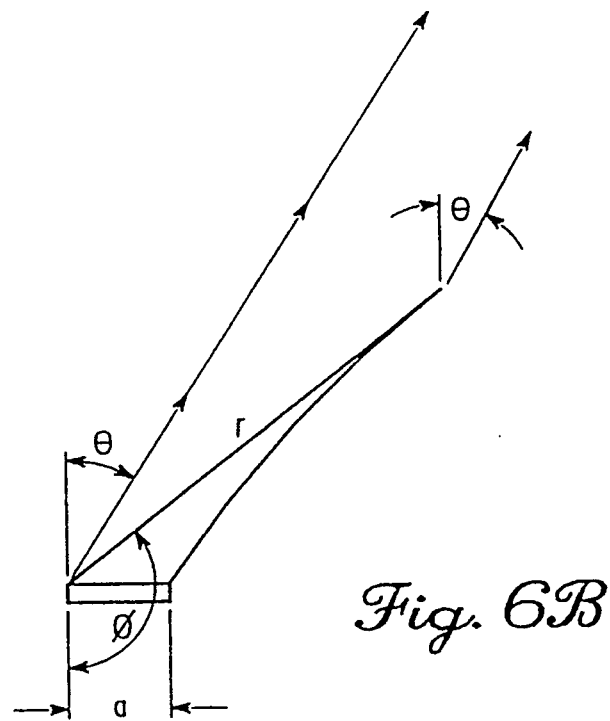
Fig. 6A
Fig. 6D
Fig. 6C
Fig. 6B

NONIMAGING OPTICAL ILLUMINATION SYSTEM

The present invention is directed generally to a method and apparatus for providing user selected nonimaging optical outputs from different types of electromagnetic energy sources. More particularly, the invention is directed to a method and apparatus wherein the design profile of an optical apparatus for optical sources can be a variable of the acceptance angle of reflection of the source ray from the optical surface. By permitting such a functional dependence, the nonimaging output can be well controlled using various different types of light sources.

Methods and apparatus concerning illumination by light sources are set forth in a number of U.S. patents including, for example, U.S. Pat. Nos. 3,957,031; 4,240,692; 4,359,265; 4,387,961; 4,483,007; 4,114,592; 4,130,107; 4,237,332; 4,230,095; 3,923,381; 4,002,499; 4,045,246; 4,912,614 and 4,003,638 all of which are incorporated by reference herein. In one of these patents the nonimaging illumination performance was enhanced by requiring the optical design to have the reflector constrained to begin on the emitting surface of the optical source. However, in practice such a design was impractical to implement due to the very high temperatures developed by optical sources, such as infrared lamps, and because of the thick protective layers or glass envelopes required on the optical source. In other designs it is required that the optical reflector be separated substantial distances from the optical source. In addition, when the optical source is small compared to other parameters of the problem, the prior art methods which use the approach designed for finite size sources provide a nonimaging output which is not well controlled; and this results in less than ideal illumination. Substantial difficulties arise when a particular illumination output is sought but cannot be achieved due to limitations in optical design. These designs are currently constrained by the teachings of the prior art that one cannot utilize certain light sources to produce particular selectable illumination output over angle.

It is therefore an object of the invention to provide an improved method and apparatus for producing a user selected nonimaging optical output from any one of a number of different light sources.

It is another object of the invention to provide a novel method and apparatus for providing user selected nonimaging optical output of light energy from optical designs using a selected light source and a matching optical reflecting surface geometry.

It is a further object of the invention to provide an improved optical apparatus and method of design wherein the illumination output over angle is a function of the optical reflection geometry of both two and three dimensional optical devices.

It is a further object of the invention to provide an improved optical apparatus and method of design for radiation collection.

It is yet another object of the invention to provide a novel optical device and method for producing a user selected intensity output over an angular range of interest.

It is still an additional object of the invention to provide an improved method and apparatus for providing a nonimaging optical illumination system which generates a substantially uniform optical output over a wide range of output angles regardless of the light source used.

Other objects, features and advantages of the present invention will be apparent from the following description of the preferred embodiments thereof, taken in conjunction with the accompanying drawings described below wherein like elements have like numerals throughout the several views.

DESCRIPTION OF THE DRAWINGS

FIG. 1 shows a two-dimensional optical device for providing nonimaging output;

FIG. 2 illustrates a portion of the optical device of FIG. 1 associated with the optical source and immediate reflecting surface of the device.

FIG. 3A illustrates a bottom portion of an optical system and FIG. 3B shows the involute portion of the reflecting surface with selected critical design dimensions and angular design parameters associated with the source;

FIG. 5A shows intensity contours for an embodiment of the invention and FIG. 5B illustrates nonimaging intensity output contours from a prior art optical design;

FIG. 6A shows a schematic of a two dimensional Lambertian source giving a $\cos^3 \theta$ illuminace distribution; FIG. 6B shows a planar light source with the Lambertian source of FIG. 6A; FIG. 6C illustrates the geometry of a nonimaging refector providing uniform illuminance to $\theta = 40°$ for the source of FIG. 6A; and FIG. 6D illustrates a three dimensional Lambertian source giving a $\cos^4 \theta$ illuminance distribution.

DETAILED DESCRIPTION OF PREFERRED EMBODIMENTS

A. Small Optical Sources

Figure 4A:
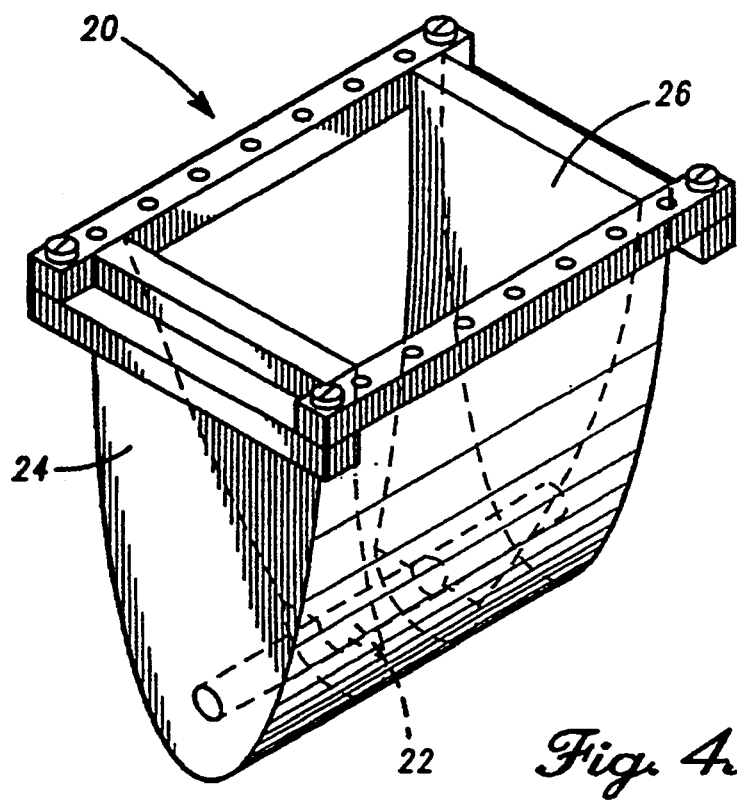
FIG 4A shows a perspective view of a three dimensional optical system for nonimaging illumination.
Figure 4B:
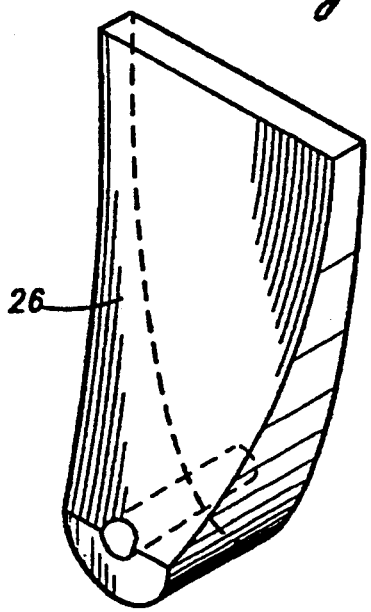
FIG. 4B shows a partial section of a reflecting side wall portion.
Figure 4C:
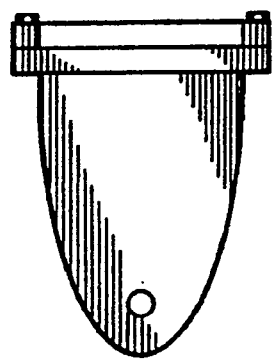
FIG. 4C is an end view of the reflecting side wall of FIG. 4B
Figure 4D:
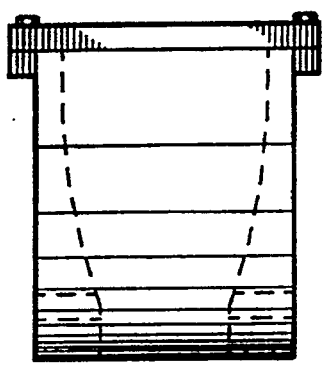
FIG. 4D is an end view of the optical system in FIG. 4A.

In the design of optical systems for providing nonimaging illumination using optical sources which are small relative to other system parameters, one should consider the limiting case where the source has no extent. This is in a sense the opposite of the usual nonimaging problem where the finite size and specific shape of the source is critical in determining the design. In any practical situation, a source of finite, but small, extent can better be accommodated by the small-source nonimaging design described herein rather than by the existing prior art finite-source designs.

We can idealize a source by a line or point with negligible diameter and seek a one-reflection solution in analogy with the conventional "edge-ray methods" of nonimaging optics (see, for example, W. T. Welford and R. Winston "High Collection Nonimaging Optics," *Academic Press*, New York, N.Y. (1989)). Polar coordinates R,φ are used with the source as origin and θ for the angle of the reflected ray as shown in FIG. 3. The geometry in FIG. 3 shows that the following relation between source angle and reflected angle applies:

$$d/d\phi(\log R) = \tan\alpha, \quad (1)$$

where $\alpha$ is the angle of incidence with respect to the normal. Therefore, $$\alpha = (\phi - \theta)/2 \quad (2)$$

Equation (1) is readily integrated to yield, $$\log(R) = \int \tan\alpha \, d\phi + \text{const.} \quad (3)$$

so that, $$R = \text{const.} \exp(\int \tan\alpha \, d\phi) \quad (4)$$

This equation (4) determines the reflector profile $R(\phi)$ for any desired functional dependence $\theta(\phi)$.

Suppose we wish to radiate power (P) with a particular angular distribution $P(\theta)$ from a line source which we assume to be axially symmetric. For example, $P(\theta) = \text{const.}$ from $\theta = 0$ to $\theta_1$ and $P(\theta) \sim 0$ outside this angular range. By conservation of energy $P(\theta)d\theta = P(\phi)d\phi$ (neglecting material reflection loss) we need only ensure that $$d\theta/d\phi = P(\phi)/P(\theta) \quad (5)$$

to obtain the desire radiated beam profile. To illustrate the method, consider the above example of a constant $P(\theta)$ for a line source. By rotational symmetry of the line source, $P(\phi) = $ a constant so that, according to Equation (4) we want $\theta$ to be a linear function of $\phi$ such as, $\theta = a\phi$. Then the solution of Equation (3) is $$R = R_0 / \cos^k(\phi/k) \quad (6)$$

where, $$k = 2/(1-a), \quad (7)$$

and $R_0$ is the value of R at $\phi = 0$. We note that the case $a = 0 (k=2)$ gives the parabola in polar form, $$R = R_0 / \cos^2(\phi/2), \quad (8)$$

while the case $\theta$-constant-$\theta_1$ gives the off-axis parabola, $$R = R_0 \cos^2(\theta_1/2) / \cos^2[(\phi-\theta_1)/2] \quad (9)$$

Suppose we desire instead to illuminate a plane with a particular intensity distribution. Then we correlate position on the plane with angle $\theta$ and proceed as above.

Turning next to a spherically symmetric point source, we consider the case of a constant $P(\Omega)$ where $\Omega$ is the radiated solid angle. Now we have by energy conservation, $$P(\Omega)d\Omega = P(\Omega_0)d\Omega_0 \quad (10)$$

where $\Omega_0$ is the solid angle radiated by the source. By spherical symmetry of the point source, $P(\Omega_0) = $ constant. Moreover, we have $d\Omega = (2\pi)d\cos\theta$ and $d\Omega_0 = (2\pi)d\cos\phi$; therefore, we need to make $\cos\theta$ a linear function of $\cos\phi$, $$\cos\theta = a\cos\phi + b \quad (11_1)$$

With the boundary conditions that $\theta = 0$ at $\phi = \theta$, $\theta = \theta_1$ at $\phi = \phi_0$, we obtain, $$a(1-\cos\theta_1)/(1-\cos\phi_0) \quad (12)$$

$$b(\cos\theta_1 - \cos\phi_0)/(1-\cos\phi_0) \quad (13)$$

For example, for $\theta_1 << 1$ and $\phi_0 \sim \pi/2$ we have, $\theta \sim \sqrt{2\theta_0} \sin(\frac{1}{2}\phi)$.] This functional dependence is applied to Equation (4) which is then integrated, such as by conventional numerical methods.

A useful way to describe the reflector profile $R(\phi)$ is in terms of the envelope (or caustic) of the reflected rays $r(\phi)$. This is most simply given in terms of the direction of the reflected ray $t = (-\sin\theta, \cos\theta)$. Since $r(\phi)$ lies along a reflected ray, it has the form, $$r = R + Lt. \quad (14)$$

where $R = R(\sin\phi_1 - \cos\phi)$. Moreover, $$Rd\phi = Ld\theta \quad (15)$$

which is a consequence of the law of reflection. Therefore, $$r = R + Rt/(d\theta/d\phi) \quad (16)$$

In the previously cited case where $\theta$ is the linear function $a\phi$, the caustic curve is particularly simple, $$r = R + Rt/a \quad (17)$$

In terms of the caustic, we may view the reflector profile R as the locus of a taut string; the string unwraps from the caustic r while one end is fixed at the origin.

In any practical design the small but finite size of the source will smear by a small amount the "point-like" or "line-like" angular distributions derived above. To prevent radiation from returning to the source, one may wish to "begin" the solution in the vicinity of $\theta = 0$ with an involute to a virtual source. Thus, the reflector design should be involute to the "ice cream cone" 0 virtual source. It is well known in the art how to execute this result (see, for example, R. Winston, "Appl. Optics," Vol. 17, p. 166 (1978)). Also, see U.S. Pat. No. 4,230,095 which is incorporated by reference herein. Similarly, the finite size of the source may be better accommodated by considering rays from the source to originate not from the center but from the periphery in the manner of the "edge rays" of nonimaging designs. This method can be implemented and a profile calculated using the computer program of the Appendix (and see FIG. 2) and an example of a line source and profile is illustrated in FIG. 1. Also, in case the beam pattern and/or source is not rotationally symmetric, one can use crossed two-dimensional reflectors in analogy with conventional crossed parabolic shaped reflecting surfaces. In any case, the present methods are most useful when the sources are small compared to the other parameters of the problem.

Various practical optical sources can include a long arc source which can be approximated by an axially symmetric line source. We then can utilize the reflector profile $R(\phi)$ determined hereinbefore as explained in expressions (5) to (9) and the accompanying text. This analysis applies equally to two and three dimensional reflecting surface profiles of the optical device.

Another practical optical source is a short arc source which can be approximated by a spherically symmetric point source. The details of determining the optical profile are shown in Equations (10) through (13).

A preferred form of nonimaging optical system 20 is shown in FIG. 4A with a representative nonimaging output illustrated in FIG. 5A. Such an output can typically be obtained using conventional infrared optical sources 22 (see FIG. 4A), for example high intensity arc lamps or graphite glow bars. Reflecting side walls 24 and 26 collect the infrared radiation emitted from the optical source 22 and reflect the radiation into the optical far field from the reflecting side walls 24 and 26. An ideal infrared generator concentrates the radiation from the optical source 22 within a particular angular range (typically a cone of about $\pm 15$ degrees) or in an asymmetric field of $\pm 20$ degrees in the horizontal plane by $\pm 6$ degrees in the vertical plane. As shown from the contours of FIG. 5B, the prior art paraboloidal reflector systems (not shown) provide a nonuniform intensity output, whereas the optical system 20 provides a substantially uniform intensity output as shown in FIG. 5A. Note the excellent improvement in intensity profile from the prior art compound parabolic concentrator (CPC) design. The improvements are summarized in tabular form in Table I below:

TABLE I

Comparison of CPC With Improved Design

|  | CPC | New Design |
|---|---|---|
| Ratio of Peak to On Axis Radiant Intensity | 1.58 | 1.09 |
| Ratio of Azimuth Edge to On Axis | 0.70 | 0.68 |
| Ratio of Elevation Edge to On Axis | 0.63 | 0.87 |
| Ratio of Corner to On Axis | 0.33 | 0.52 |
| Percent of Radiation Inside Useful Angles | 0.80 | 0.78 |
| Normalized Mouth Area | 1.00 | 1.02 |

In a preferred embodiment designing an actual optical profile involves specification of four parameters. For example, in the case of a concentrator design, these parameters are:
1. a = the radius of a circular absorber;
2. b = the size of the gap;
3. c = the constant of proportionality between $\theta$ and $\phi - \phi_0$ in the equation $\theta = c(\phi - \phi_0)$;
4. h = the maximum height.

A computer program has been used to carry out the calculations, and these values are obtained from the user (see lines six and thirteen of the program which is attached as a computer software Appendix included as part of the specification).

From $\phi = 0$ to $\phi = \phi_0$ in FIG. 3B the reflector profile is an involute of a circle with its distance of closest approach equal to b. The parametric equations for this curve are parameterized by the angle $\alpha$ (see FIG. 3A). As can be seen in FIG. 3B, as $\phi$ varies from 0 to $\phi_0$, $\alpha$ varies from $\alpha_0$ to ninety degrees. The angle $\alpha_0$ depends on a and b, and is calculated in line fourteen of the computer software program. Between lines fifteen and one hundred one, fifty points of the involute are calculated in polar coordinates by stepping through these parametric equations. The (r,$\theta$) points are read to arrays r(i), and theta(i), respectively.

For values of $\phi$ greater than $\phi_0$, the profile is the solution to the differential equation:

$$d(\ln r)d\phi = \tan\{\tfrac{1}{2}[\phi - \theta + \arcsin(a/r)]\}$$

where $\theta$ is a function of $\phi$. This makes the profile r($\phi$) a functional of $\theta$. In the sample calculation performed, $\theta$ is taken to be a linear function of $\phi$ as in item 3 above. Other functional forms are described in the specification. It is desired to obtain one hundred fifty (r, theta) points in this region. In addition, the profile must be truncated to have the maximum height, h. We do not know the (r,theta) point which corresponds to this height, and thus, we must solve the above equation by increasing phi beyond $\phi_0$ until the maximum height condition is met. This is carried out using the conventional fourth order Runga-Kutta numerical integration method between lines one hundred two and one hundred and fifteen. The maximum height condition is checked between lines one hundred sixteen and one hundred twenty.

Once the (r,theta) point at the maximum height is known, we can set our step sizes to calculate exactly one hundred fifty (r,theta) points between $\phi_0$ and the point of maximum height. This is done between lines two hundred one and three hundred using the same numerical integration procedure. Again, the points are read into arrays r(i), theta(i).

In the end, we are left with two arrays: r(i) and theta(i), each with two hundred components specifying two hundred (r,theta) points of the reflector surface. These arrays can then be used for design specifications, and ray trace applications.

In the case of a uniform beam design profile, (P($\theta$)=constant), a typical set of parameters is (also see FIG. 1):
a = 0.055 in.
b = 0.100 in.
h = 12.36 in.
c = 0.05136
for $\theta(\phi) = c(\phi - \phi_o)$ In the case of an exponential beam profile (P($\theta$)=ce$^{-a\theta}$) a typical set of parameters is:
a ~ o
h = 5.25
b = 0.100
c = 4.694
$\theta(\phi) = 0.131\ln(1 - \phi/c)$

B. General Optical Sources

Nonimaging illumination can also be provided by general optical sources provided the geometrical constraints on a reflector can be defined by simultaneously solving a pair of system. The previously recited equations (1) and (2) relate the source angle and angle of light reflection from a reflector surface, $$d/d\phi(\log R_i) = \tan(\phi_i - \theta_i)/2 \tag{18}$$

and the second general expression of far field illuminance is, $$L(\theta_i) \cdot R_i \sin(\phi_i - \theta_i) G(\theta_i) = I(\theta_i) \tag{19}$$

where L ($\theta_i$) is the characteristic luminance at angle $\theta_i$ and G ($\theta_i$) is a geometrical factor which is a function of the geometry of the light source. In the case of a two dimensional Lambertian light source as illustrated in FIG. 6A, the radiated power versus angle for constant illuminance varies as $\cos^{-2}\theta$. For a three dimensional Lambertian light source shown in FIG. 6D, the radiated power versus angle for constant illuminance varies as $\cos^{-3}\theta$.

Considering the example of a two dimensional Lambertian light source and tile planar source illustrated in FIG. 6B, the concept of using a general light source to produce a selected far field illuminance can readily be illustrated. Notice with our sign convention angle $\theta$ in FIG. 6B is negative. In this example we will solve equations (18) and (19) simultaneously for a uniform far field illuminance using the two dimensional Lambertian source. In this example, equation (19) because, $$R_i \sin(\phi_i - \theta_i) \cos^2\theta_i = I(\theta_i)$$

Generally for a bare two dimensional Lambertian source, $$I(\theta_i) \sim \delta \cos \theta_i$$

$$\delta \sim a \cos \theta_i / 1$$

$$1 \sim d / \cos \theta$$

Therefore, $I \sim \cos^3 \theta$.

Figure 7A:
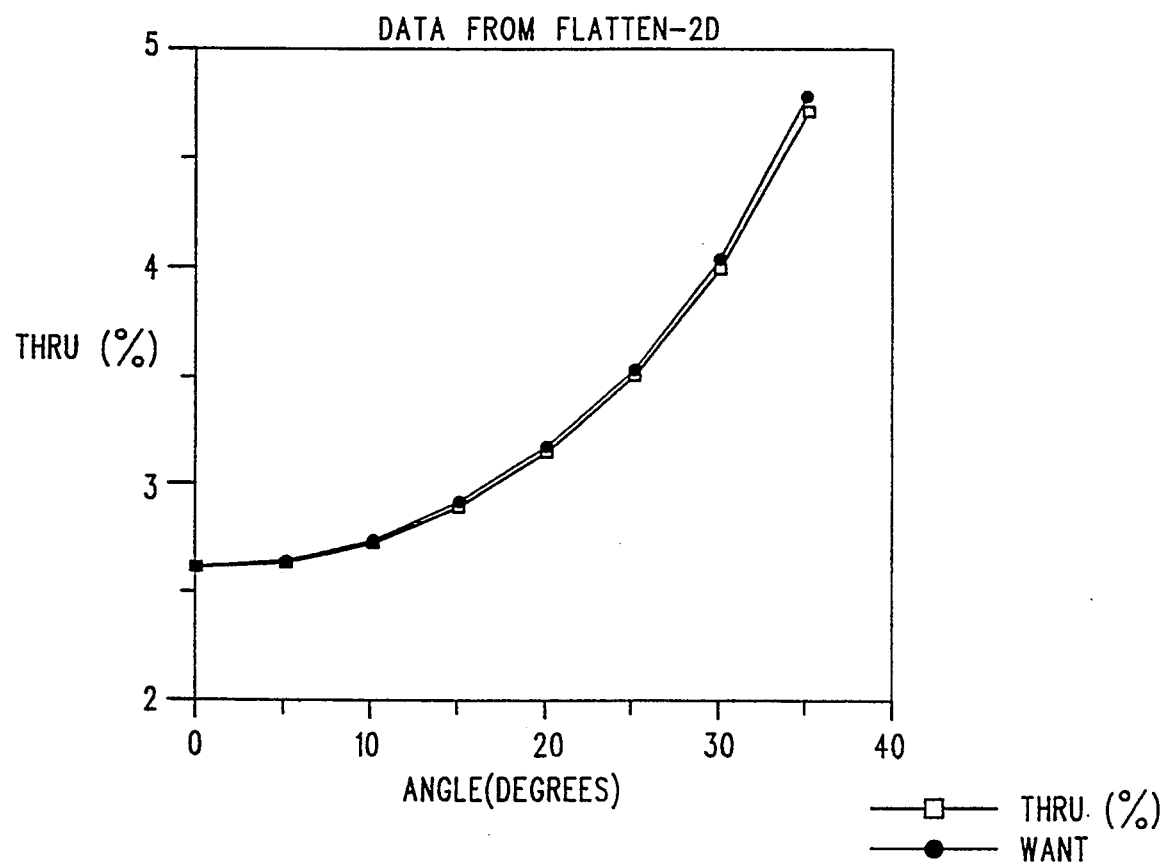
FIG. 7A shows a two dimensional solution ray trace analysis.

In the case of selecting a uniform far field illuminance $I(\theta_i) = C$, and if we solve equations (18) and (19), $d/d\phi (\log R_i) = \tan(\phi_i - \theta_i)/2$ and $\log R_i + \log \sin(\phi_i - \theta_i) + 2 \log \cos \theta_i = \log C = $ constant solving $d\phi_i/d\theta_i = -2 \tan\theta_i \sin(\phi_i - \theta_i) - \cos(\phi_i - \theta_i)$ or let $\psi_i = \phi_i - \theta_i$ $d\psi_i/d\theta_i = 1 + \sin \psi_i - 2 \tan \theta_i \cos \psi_i$ Solving numerically by conventional methods, such as the Runge-Kutta method, starting at $\psi_i = 0$ at $\theta_i$, for the constant illuminance, $d\psi_i/d\theta_i = 1 + \sin \psi_i - n \tan \theta_i \cos \psi_i$ where n is two for the two dimensional source. The resulting reflector profile for the two dimensional solution is shown in FIG. 6C and the tabulated data characteristic of FIG. 6C is shown in Table III. The substantially exact nature of the two dimensional solution is clearly shown in the ray trace fit of FIG. 7A. The computer program used to perform these selective calculation is included as Appendix B of the Specification. For a bare three dimensional Lambertian source where $I(\theta_i) \sim \cos^4\theta_i$, n is larger than 2 but less than 3.

Figure 7B:
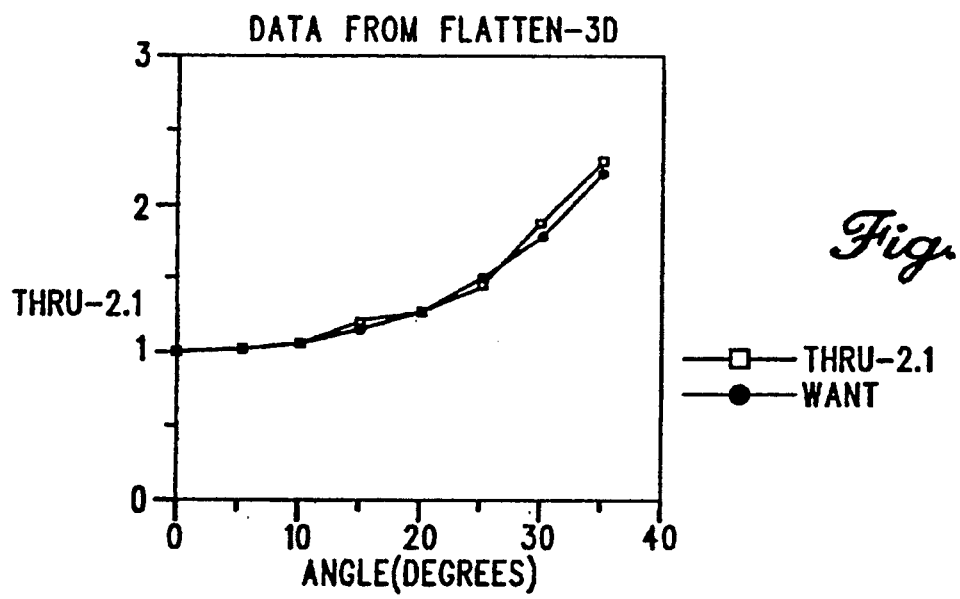
FIG. 7B illustrates a first emperical fit to the three dimensional solution with n=2.1.
Figure 7C:
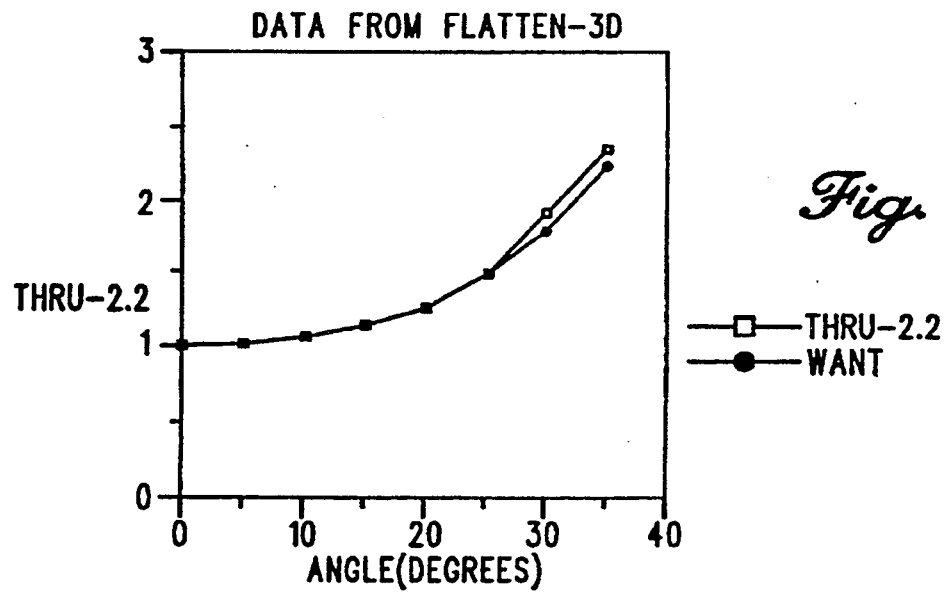
FIG. 7C is a second emperical fit with n=2.2 and FIB. 7D is a third emperical fit with n=3.
Figure 7D:
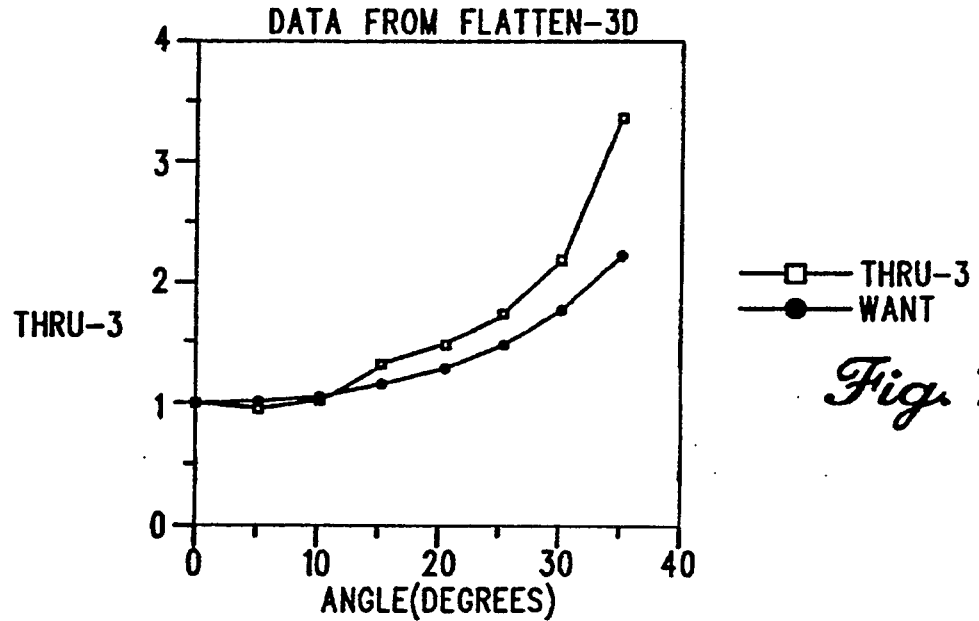

The ray trace fit for this three dimensional solution is shown in FIG. 7B–7D wherein the "n" value was fitted for desired end result of uniform far field illuminance with the best fit being about n=2.1 (see FIG. 7B).

Other general examples for different illuminance sources include, (1) $I(\theta_i) = A \exp(B\theta_i)$ for a two dimensional, exponential illuminance for which one must solve the equation, $$d\psi_i/d\theta_i 1 + \sin \psi_i - 2 \tan \theta_i \cos \psi_i + B$$

(2) $I(\theta_i) = A \exp(-B\theta_i^2/2)$ for a two dimensional solution for a Gaussian illuminance for which one must solve, $$d\psi_i/d\theta_i = 1 + \sin \psi_i - 2 \tan \theta_i \cos \psi_i - B\theta_i$$

Equations (18) and (19) can of course be generalized to include any light source for any desired for field illuminance for which one of ordinary skill in the art would be able to obtain convergent solutions in a conventional manner.

A ray trace of the uniform beam profile for the optical device of FIG. 1 is shown in a tabular form of output in Table II below:

| AZIMUTH | | | | | | | | | | | | | | |
|---|---|---|---|---|---|---|---|---|---|---|---|---|---|---|
| 114 | 202 | 309 | 368 | 422 | 434 | 424 | 608 | 457 | 448 | 400 | 402 | 315 | 229 | 103 |
| 145 | 295 | 398 | 455 | 490 | 576 | 615 | 699 | 559 | 568 | 511 | 478 | 389 | 298 | 126 |
| 153 | 334 | 386 | 465 | 515 | 572 | 552 | 622 | 597 | 571 | 540 | 479 | 396 | 306 | 190 |
| 202 | 352 | 393 | 452 | 502 | 521 | 544 | 616 | 629 | 486 | 520 | 432 | 423 | 352 | 230 |
| 197 | 362 | 409 | 496 | 496 | 514 | 576 | 511 | 549 | 508 | 476 | 432 | 455 | 335 | 201 |
| 241 | 377 | 419 | 438 | 489 | 480 | 557 | 567 | 494 | 474 | 482 | 459 | 421 | 379 | 230 |
| 251 | 364 | 434 | 444 | 487 | 550 | 503 | 558 | 567 | 514 | 500 | 438 | 426 | 358 | 231 |
| 243 | 376 | 441 | 436 | 510 | 526 | 520 | 540 | 540 | 482 | 506 | 429 | 447 | 378 | 234 |
| 233 | 389 | 452 | 430 | 489 | 519 | 541 | 547 | 517 | 500 | 476 | 427 | 442 | 344 | 230 |
| 228 | 369 | 416 | 490 | 522 | 501 | 539 | 546 | 527 | 481 | 499 | 431 | 416 | 347 | 227 |
| 224 | 359 | 424 | 466 | 493 | 560 | 575 | 553 | 521 | 527 | 526 | 413 | 417 | 320 | 205 |
| 181 | 378 | 392 | 489 | 485 | 504 | 603 | 583 | 563 | 530 | 512 | 422 | 358 | 308 | 194 |
| 150 | 326 | 407 | 435 | 506 | 567 | 602 | 648 | 581 | 535 | 491 | 453 | 414 | 324 | 179 |
| 135 | 265 | 382 | 450 | 541 | 611 | 567 | 654 | 611 | 522 | 568 | 446 | 389 | 300 | 130 |
| 129 | 213 | 295 | 364 | 396 | 404 | 420 | 557 | 469 | 435 | 447 | 351 | 287 | 206 | 146 |
| ELEVATION | | | | | | | | | | | | | | |

TABLE III

| Phi | Theta | r |
|---|---|---|
| 90.0000 | 0.000000 | 1.00526 |
| 90.3015 | 0.298447 | 1.01061 |
| 90.6030 | 0.593856 | 1.01604 |
| 90.9045 | 0.886328 | 1.02156 |
| 91.2060 | 1.17596 | 1.02717 |
| 91.5075 | 1.46284 | 1.03286 |
| 91.8090 | 1.74706 | 1.03865 |
| 92.1106 | 2.02870 | 1.04453 |
| 92.4121 | 2.30784 | 1.05050 |
| 92.7136 | 2.58456 | 1.05657 |
| 93.0151 | 2.85894 | 1.06273 |
| 93.3166 | 3.13105 | 1.06899 |
| 93.6181 | 3.40095 | 1.07536 |
| 93.9196 | 3.66872 | 1.08182 |
| 94.2211 | 3.93441 | 1.08840 |
| 94.5226 | 4.19810 | 1.09507 |
| 94.8241 | 4.45983 | 1.10186 |
| 95.1256 | 4.71967 | 1.10876 |
| 95.4271 | 4.97767 | 1.11576 |
| 95.7286 | 5.23389 | 1.12289 |
| 96.0302 | 5.48838 | 1.13013 |
| 96.3317 | 5.74120 | 1.13749 |
| 96.6332 | 5.99238 | 1.14497 |
| 96.9347 | 6.24197 | 1.15258 |
| 97.2362 | 6.49004 | 1.16031 |
| 97.5377 | 6.73661 | 1.16817 |
| 97.8392 | 6.98173 | 1.17617 |
| 98.1407 | 7.22545 | 1.18430 |
| 98.4422 | 7.46780 | 1.19256 |
| 98.7437 | 7.70883 | 1.20097 |
| 99.0452 | 7.94857 | 1.20952 |
| 99.3467 | 8.18707 | 1.21822 |
| 99.6482 | 8.42436 | 1.22707 |
| 99.9498 | 8.66048 | 1.23607 |
| 100.251 | 8.89545 | 1.24522 |
| 100.553 | 9.12933 | 1.25454 |

TABLE III-continued

| Phi | Theta | r |
|---|---|---|
| 100.854 | 9.36213 | 1.26402 |
| 101.156 | 9.59390 | 1.27367 |
| 101.457 | 9.82466 | 1.28349 |
| 101.759 | 10.0545 | 1.29349 |
| 102.060 | 10.2833 | 1.30366 |
| 102.362 | 10.5112 | 1.31402 |
| 102.663 | 10.7383 | 1.32457 |
| 102.965 | 10.9645 | 1.33530 |
| 103.266 | 11.1899 | 1.34624 |
| 103.568 | 11.4145 | 1.35738 |
| 103.869 | 11.6383 | 1.36873 |
| 104.171 | 11.8614 | 1.38028 |
| 104.472 | 12.0837 | 1.39206 |
| 104.774 | 12.3054 | 1.40406 |
| 105.075 | 12.5264 | 1.41629 |
| 105.377 | 12.7468 | 1.42875 |
| 105.678 | 12.9665 | 1.44145 |
| 105.980 | 13.1857 | 1.45441 |
| 106.281 | 13.4043 | 1.46761 |
|  |  | 1.48108 |
| 107.789 | 14.4898 | 1.53770 |
| 108.090 | 14.7056 | 1.55259 |
| 108.392 | 14.9209 | 1.56778 |
| 108.693 | 15.1359 | 1.58329 |
| 108.995 | 15.3506 | 1.59912 |
| 109.296 | 15.5649 | 1.61529 |
| 109.598 | 15.7788 | 1.63181 |
| 109.899 | 15.9926 | 1.64868 |
| 110.201 | 16.2060 | 1.66591 |
| 110.503 | 16.4192 | 1.68353 |
| 110.804 | 16.6322 | 1.70153 |
| 111.106 | 16.8450 | 1.71994 |
| 111.407 | 17.0576 | 1.73876 |
| 111.709 | 17.2701 | 1.75801 |
| 112.010 | 17.4824 | 1.77770 |
| 112.312 | 17.6946 | 1.79784 |
| 112.613 | 17.9068 | 1.81846 |
| 112.915 | 18.1188 | 1.83956 |
| 113.216 | 18.3309 | 1.86117 |
| 113.518 | 18.5429 | 1.88330 |
| 113.819 | 18.7549 | 1.90596 |
| 114.121 | 18.9670 | 1.92919 |
| 114.422 | 19.1790 | 1.95299 |
| 114.724 | 19.3912 | 1.97738 |
| 115.025 | 19.6034 | 2.00240 |
| 115.327 | 19.8158 | 2.02806 |
| 115.628 | 20.0283 | 2.05438 |
| 115.930 | 20.2410 | 2.08140 |
| 116.231 | 20.4538 | 2.10913 |
| 116.533 | 20.6669 | 2.13761 |
| 116.834 | 20.8802 | 2.16686 |
| 117.136 | 21.0938 | 2.19692 |
| 117.437 | 21.3076 | 2.22782 |
| 117.739 | 21.5218 | 2.25959 |
| 118.040 | 21.7362 | 2.29226 |
| 118.342 | 21.9511 | 2.32588 |
| 118.643 | 22.1663 | 2.36049 |
| 118.945 | 22.3820 | 2.39612 |
| 119.246 | 22.5981 | 2.43283 |
| 119.548 | 22.8146 | 2.47066 |
| 119.849 | 23.0317 | 2.50967 |
| 120.151 | 23.2493 | 2.54989 |
| 120.452 | 23.4674 | 2.59140 |
| 120.754 | 23.6861 | 2.63426 |
| 121.055 | 23.9055 | 2.67852 |
| 121.357 | 24.1255 | 2.72426 |
| 121.658 | 24.3462 | 2.77155 |
| 121.960 | 24.5676 | 2.82046 |
| 122.261 | 24.7898 | 2.87109 |
| 122.563 | 25.0127 | 2.92352 |
| 122.864 | 25.2365 | 2.97785 |
| 123.166 | 25.4611 | 3.03417 |
| 123.467 | 25.6866 | 3.09261 |
| 123.769 | 25.9131 | 3.15328 |
| 124.070 | 26.1406 | 3.21631 |
| 124.372 | 26.3691 | 3.28183 |
| 124.673 | 26.5986 | 3.34999 |
| 124.975 | 26.8293 | 3.42097 |
| 125.276 | 27.0611 | 3.49492 |
| 125.578 | 27.2941 | 3.57205 |
| 125.879 | 27.5284 | 3.65255 |
| 126.181 | 27.7640 | 3.73666 |
| 126.482 | 28.0010 | 3.82462 |
| 126.784 | 28.2394 | 3.91669 |
| 127.085 | 28.4793 | 4.01318 |
| 127.387 | 28.7208 | 4.11439 |
| 127.688 | 28.9638 | 4.22071 |
| 127.990 | 29.2086 | 4.33250 |
| 128.291 | 29.4551 | 4.45022 |
| 128.593 | 29.7034 | 4.57434 |
| 128.894 | 29.9536 | 4.70540 |
| 129.196 | 30.2059 | 4.84400 |
| 129.497 | 30.4602 | 4.99082 |
| 129.799 | 30.7166 | 5.14662 |
| 130.101 | 30.9753 | 5.31223 |
| 130.402 | 31.2365 | 5.48865 |
| 130.704 | 31.5000 | 5.67695 |
| 131.005 | 31.7662 | 5.87841 |
| 131.307 | 32.0351 | 6.09446 |
| 131.608 | 32.3068 | 6.32678 |
| 131.910 | 32.5815 | 6.57729 |
| 132.211 | 32.8593 | 6.84827 |
| 132.513 | 33.1405 | 7.14236 |
| 132.814 | 33.4251 | 7.46272 |
| 133.116 | 33.7133 | 7.81311 |
| 133.417 | 34.0054 | 8.19804 |
| 133.719 | 34.3015 | 8.62303 |
| 134.020 | 34.6019 | 9.09483 |
| 134.322 | 34.9068 | 9.62185 |
| 134.623 | 35.2165 | 10.2147 |
| 134.925 | 35.5314 | 10.8869 |
| 135.226 | 35.8517 | 11.6561 |
| 135.528 | 36.1777 | 12.5458 |
| 135.829 | 36.5100 | 13.5877 |
| 136.131 | 36.8489 | 14.8263 |
| 136.432 | 37.1949 | 16.3258 |
| 136.734 | 37.5486 | 18.1823 |
| 137.035 | 37.9106 | 20.5479 |
| 137.337 | 38.2816 | 23.6778 |
| 137.638 | 38.6625 | 28.0400 |
| 137.940 | 39.0541 | 34.5999 |
| 138.241 | 39.4575 | 45.7493 |
| 138.543 | 39.8741 | 69.6401 |
| 138.844 | 40.3052 | 166.255 |
| 139.146 | 40.7528 | 0.707177E-01 |
| 139.447 | 41.2190 | 0.336171E-01 |
| 139.749 | 41.7065 | 0.231080E-01 |
| 140.050 | 42.2188 | 0.180268E-01 |
| 140.352 | 42.7602 | 0.149969E-01 |
| 140.653 | 43.3369 | 0.129737E-01 |
| 140.955 | 43.9570 | 0.115240E-01 |
| 141.256 | 44.6325 | 0.104348E-01 |
| 141.558 | 45.3823 | 0.958897E-02 |
| 141.859 | 46.2390 | 0.891727E-02 |
| 142.161 | 47.2696 | 0.837711E-02 |
| 142.462 | 48.6680 | 0.794451E-02 |
| 142.764 | 50.0816 | 0.758754E-02 |
| 143.065 | 48.3934 | 0.720659E-02 |
| 143.367 | 51.5651 | 0.692710E-02 |
| 143.668 | 51.8064 | 0.666772E-02 |
| 143.970 | 56.1867 | 0.647559E-02 |
| 144.271 | 55.4713 | 0.628510E-02 |
| 144.573 | 54.6692 | 0.609541E-02 |
| 144.874 | 53.7388 | 0.590526E-02 |
| 145.176 | 52.5882 | 0.571231E-02 |
| 145.477 | 50.8865 | 0.550987E-02 |
| 145.779 | 53.2187 | 0.534145E-02 |
| 146.080 | 52.1367 | 0.517122E-02 |
| 146.382 | 50.6650 | 0.499521E-02 |
| 146.683 | 49.5225 | 0.481649E-02 |
| 146.985 | 45.6312 | 0.459624E-02 |
| 147.286 | 56.2858 | 0.448306E-02 |
| 147.588 | 55.8215 | 0.437190E-02 |
| 147.889 | 55.3389 | 0.426265E-02 |
| 148.191 | 54.8358 | 0.415518E-02 |
| 148.492 | 54.3093 | 0.404938E-02 |
| 148.794 | 53.7560 | 0.394512E-02 |
| 149.095 | 53.1715 | 0.384224E-02 |
| 149.397 | 52.5498 | 0.374057E-02 |
| 149.698 | 51.8829 | 0.363992E-02 |
| 150.000 | 51.1597 | 0.354001E-02 |

APPENDIX A

```
1         program coordinates
2         dimension r(1:200), theta(1:200), dzdx(1:200)
3         dimension xx(1:200), zz(1:200)
4         real l, k1, k2, k3, k4
5         parameter (degtorad=3.1415927/180.0)

6         write(*,*)'Enter radius of cylindrical absorber.'
7         read(*,*)a
8         write(*,*)'Enter gap size.'
9         read(*,*)b
10        write(*,*)'Enter constant.'
11        read(*,*)c
12        write(*,*)'Enter maximum height.'
13        read(*,*)h c     GENERATE 50 POINTS OF AN INVOLUTE
14        alpha0= acos(a/(a + b))
15        do 100 i=1,50,1
16           alpha= ((90*degtorad-alpha0)/49.0)*float(i-50)+90*degtorad
17           d= (alpha-alpha0)*a + sqrt((a+b)**2 - a**2)
18           x= a*sin(alpha) - d*cos(alpha)
19           z= -a*cos(alpha) - d*sin(alpha)
20           r(i)= sqrt(x**2 + z**2)
21           theta(i)= atan(z/x)
22           phi= theta(i) + (90.0*degtorad)
100       continue
101       theta(1)= -90.0*degtorad c     GENERATE 150 POINTS OF THE WINSTON-TYPE CONCENTRATOR
102       v= 0.0
103       h= 0.001
104       phi0= theta(50) + (90.0*degtorad) + 0.001
105       phi= phi0
106       f= alog(r(50))
107       do 200 while(v.eq.0.0)
108          phi= phi + h
109          k1= h*tan(0.5*((1.0-c)*phi+c*phi0+asin(a/exp(f))))
110          k2= h*tan(0.5*((1.0-c)*(phi+0.5*h)+c*phi0+
     &        asin(a/exp(f+0.5*k1))))
111          k3= h*tan(0.5*((1.0-c)*(phi+0.5*h)+c*phi0+
     &        asin(a/exp(f+0.5*k2))))
112          k4= h*tan(0.5*((1.0-c)*(phi+h)+c*phi0+
     &        asin(a/exp(f+k3))))
113          f= f + (k1/6.0) + (k2/3.0) + (k3/3.0) + (k4/6.0)
114          rad= exp(f)
115          z= rad*sin(phi-(90*degtorad))
116          if(z.ge.e) then
117             phimax= phi
118             write(*,*)'phimax=',phi/degtorad
119             v= 1.0
120          endif
200       continue 201       f= alog(r(50))
202       phi= (-1.0/149.0)*(phimax-phi0)+phi0
203       h= (phimax-phi0)/149.0
204       do 300 i=1,150,1
205          phi= phi + h
206          k1= h*tan(0.5*((1.0-c)*phi+c*phi0+asin(a/exp(f))))
207          k2= h*tan(0.5*((1.0-c)*(phi+0.5*h)+c*phi0+
     &        asin(a/exp(f+0.5*k1))))
208          k3= h*tan(0.5*((1.0-c)*(phi+0.5*h)+c*phi0+
     &        asin(a/exp(f+0.5*k2))))
209          k4= h*tan(0.5*((1.0-c)*(phi+h)+c*phi0+
     &        asin(a/exp(f+k3))))
210          f= f + (k1/6.0) + (k2/3.0) + (k3/3.0) + (k4/6.0)
211          r(i+50)= exp(f)
212          theta(i+50)= phi - (90.0*degtorad)
300       continue 301       stop
302       end
```

EXHIBIT B

```
c*********************************************************************
c main program
c
      program raytrace common/splinecom/r(0:199),h(0:199),d2r(0:199)
      common/sincos/x,y
      common/cpc/rentrance,angle,rexit,t
      common/rays/ntarg,nenter,nthrough,nmissed,
     &     ntot,avgn,nrfloss,nreject
      common/input_files/kin,rfile_name
      common/dist/dtarg
      common/reflec/rho,pthrough,refl_thru,refl_tot
      common/energy/E_per_ray common/b_p_out/i_data
      common/der/dr(0:199),d3r(0:199)
      double precision translation_matrix(4,4)
      character*8   rfile_name
      double precision theta_j,theta_k parameter (xacc=1e-7,pi=3.14159)

i_data=0
      fluxfile=14 c----- input parameters from file
      call input c
c     file 'cpcflux' is always produced and is an output grid
c     of the exit plane, in KW/m/m.
c open(fluxfile,file='cpcflux', status='unknown')
      open(23,file='perform.dat',status='unknown')
c     Write headder for entire set of rays being traced
c
      write(23,1125)
c     The variables angle and rentrance will be read from
c     file 'config.cpc' allong with the other parameters.

open(kin,file=rfile_name,status='old')
      read(kin,*)
      read(kin,*)
      write(*,*)'reflect',rho ,' acceptance half angle = ',angle
      write(*,*)' entrance radius = ',rentrance
      write(*,*)' truncation factor ', t
      write(*,*) ntarg, ' rays being traced ...' c------setup representation of cpc wall
      call coordinates
      call spline(r,h,d2r)
      call derivative
      call spline(dr,h,d3r)
      call initialize
      write(*,*)'Enter distance from exit plane to exit aperture.'
      read(*,*)d
      write(*,*)'Enter radius of position output grid.'
      write(*,*)'[ Enter -1 for exit aperture radius,'
      write(*,*)'  and -2 for entrance aperture radius.'
      write(*,*)'  To choose another radius, you must'
      write(*,*)'  enter its numerical value. ]'
      read(*,*)s
      if(s.eq.-1.0) then
        s= r(0)
      elseif(s.eq.-2.0) then
        s= r(199)
      endif
```

```
            call theta_out(xcos,ycos,th_o,0)
            write(*,*)'Enter angle.'
            read(*,*)gamma
            gamma= (3.1415926535/180.0)*gamma
            write(*,*)'Enter random number seed.'
            read(*,*)idum c    %%%%%%%%%%%%%%%%%%%%%%%%%%%%%%%%%
c-----main tracing loop begins
            idisplay= ntarg/5
            do 999 i=1,30000,1
              if ( mod(i, idisplay).eq. 0) write(*,*) 'ray ',i c ----get ray --- xcos= sin(gamma)
            ycos= 0.0
            zcos=-sqrt(1.0-(xcos*xcos+ycos*ycos))
            call chooseray(idum,x0,y0)
            z0=h(199)
c           write(*,*)'x0=',x0,'y0=',y0,'z0=',z0
c           write(*,*)
c           pause
            call trace(xcos,ycos,zcos,x0,y0,z0,d,s,f,rx,th_o,nin)
999     continue
c------end main tracing loop---------------
c    %%%%%%%%%%%%%%%%%%%%%%%%%%%%%%%%%
c       avgn=float(ntot)/float(nthrough+nreject)
c   ntot, has been abandoned for a normalized #of reflections.
c
        avgn=(ntot/10000.0)
        through=(float(nthrough)/(float(ntarg-nmissed)))*100.0
        flux =(pthrough/(10000*r(0)*r(0)*pi))* E_per_ray* 1.0e4
        power = pthrough*E_per_ray
        thrunet=(pthrough/(float(ntarg-nmissed)))*100.0
        write(*,*)'total rays through, missed, rejected '
        write(*,*) nthrough,nmissed, nreject
        write(*,*)'throughput percentage=',through
        write(*,*)'average number of reflections=',avgn
        write(*,*)'flux in exit plane=',flux
        write(*,*)'Maximum output angle=',(180.0/3.14159)*th_o
        close(kin)

c
c   unit 23 is the file perform.dat, and contains a summary of
c   information for each cpc which is traced.
c
        write(23,1123)rentrance*100,rexit*100,nthrough,nmissed,nreject,
     &                power,through,flux,avgn,thrunet
1111    continue
        write(23,1124)angle, t
        close(23)
        close(fluxfile)

9901    FORMAT (1X,I5,6F8.3)

1123    format(' ',f5.2,'cm'1x,f5.2,2(1x,i4),1x,i4,2x,
     +          f6.3,2x,f5.1,2x,f7.1,1x,f6.3,2x,f5.1)
1124    format(' for a ',f5.2,' degree CPC, of ',f5.2,'x max height')
1125    format('  rent   rexit  nthru nmiss nrej    KW    %thru',
     +         '    flux    avgn     netthru')

write(*,*)'Angle='
        write(*,*)gamma*(180.0/3.1415926535)

stop
        end
```

```
      subroutine trace(xcos,ycos,zcos,x0,y0,z0,
     &                 dist,scale,th_o,nin)

dimension r(0:199),h(0:199),d2r(0:199)

common/splinecom/r,h,d2r
      common/sincos/x,y
      common/cpc/rentrance,angle,rexit,t
      common/rays/ntarg,nenter,nthrough,nmissed,
     &           ntot,avgn,nrfloss,nreject
      common/input_files/kin,rfile_name common/reflec/rho,pthrough,refl_thru,refl_tot
      common/dist/dtarg
      common/der/dr(0:199),d3r(0:199)
      parameter (xacc=1e-4,pi=3.14159)
      real nx, ny, nz
      data xsmall/ 0.99/ if ((x02+y02).gt.r(199)**2) then
         nmissed = nmissed+1
         write(*,*)'sorry!'
         RETURN
      endif c ----- ray has entered cpc, initialize trace variables
      n=0
      hnewt=z0 c ----- trace ray, ----
10    continue
      dxdz=xcos/zcos
      dydz=ycos/zcos
      u=(-z0*dxdz+x0)**2+
     +    (-z0*dydz+y0)**2
      v=(dxdz*(h(199)-z0)+x0)**2+
     +    (dydz*(h(199)-z0)+y0)**2 c--- test if ray leaves exit or entrance aperature ----
c------- ray hits exit aperature
c--- translate ray, target plane need not be at exit aperature, if(sqrt(u).le.r(0))then
         xf= -dxdz*(z0+dist)+x0
         yf= -dydz*(z0+dist)+y0
c        write(*,*)
c        write(*,*)'xf=',xf,'yf=',yf
c        write(*,*)
c        pause
         write(*,*)'hitty!'
         nin= nin+1 c--- calculate the greatest value of the output angle ----
         call theta_out(xcos,ycos,th_o,1)

nthrough=nthrough+1
         rtemp=0.0
         do jref=0,n-1
            rtemp=rtemp+rho**jref
         enddo
         refl_thru=refl_thru+rtemp
         ntot=ntot+n
         refl_tot=refl_tot+rtemp
         pthrough=pthrough+1*rho**n
         RETURN
      elseif((sqrt(v).le.r(199)).and.(zcos.gt.0.0))then
```

```
c------ray leaves top--------------------
          xf=x0 + (h(199)-z0) * dxdz
          yf=y0 + (h(199)-z0) * dydz
c           write(*,*)
c           write(*,*)'xf=',xf,'yf=',yf
c           write(*,*)
c           pause
          rtemp=0.0
          do jref=0,n-1
              rtemp=rtemp+rho**jref
          enddo
          ntot=ntot+n
          refl_tot=refl_tot+rtemp
          nreject=nreject+1
          RETURN
        endif c --- get first guess ----
        hold=hnewt
        htemp=hnewt
        if(zcos.lt.0.0)then
            hnewt=0.5*hnewt
        elseif(zcos.gt.0.0)then
            hnewt=0.5*(h(199)+hnewt)
        endif
c_____
c ---- the intersection will now be found ----
        d=4*xacc
        isis= 0
        do 100 while ((abs(d).gt.xacc).and.(hnewt.ne.htemp))
          htemp=hnewt
c         --- get d=Rcpc-Rray at hnewt ,
          call splint(rnewt,hnewt,r,h,d2r)
          temp=(hnewt-z0)/zcos
          a=xcos*temp+x0
          b=ycos*temp+y0
          rray=sqrt(a**2+b**2)
          d=rnewt-rray c           write(*,*)
c           write(*,*)'n=',n
c           write(*,*)'hnewt=',hnewt
c           write(*,*)'x=',a
c           write(*,*)'y=',b
c           write(*,*)'zcos=',zcos
c           write(*,*)'d=',d
c           write(*,*)
c           pause c      --- bisect if ray is way outside cpc    or
c      --- if ray is not acceptably close to cpc then
c          new guess is just d further along ray. --- hnewt=hnewt+zcos*d if (hnewt.gt.h(199)) hnewt=h(199)
        if (hnewt.lt.0.0) hnewt= 0.0
        isis= isis+1
        if(isis.gt.1000) then
           write(*,*)'BAD BOY!!!'
           RETURN
        endif
100     continue
c---- the intersection is at z0=hnewt
c-------------------------------------------------------------
        hold=hnewt c       --- the ray intersects the cpc at hnewt
c       now the new (x0,y0,z0) will be found
```

```
            x0=(hnewt-z0)*dxdz+x0
            y0=(hnewt-z0)*dydz+y0
            z0=hnewt
c           write(*,*)
c           write(*,*)'(',x0,y0,z0,')'
c           write(*,*)
c           pause c        now the unit normal at (x0,y0,z0) will be found
            rr=sqrt(x02+y02)
            call splint(drn,z0,dr,h,d3r)

w=sqrt(1.0/(drn**2)+1.0)
            nx=(-x0)/(rr*drn*w)
            ny=(-y0)/(rr*drn*w)
            nz=1.0/w c        now we will find the reflected ray, and hence,
c        the new direction cosines dot=xcos*nx+ycos*ny+zcos*nz xcos=xcos-2*dot*nx
            ycos=ycos-2*dot*ny
            zcos=zcos-2*dot*nz c        normalize new dir cosines(to make sure that the sum of the squares=1)
            s=sqrt(xcos2+ycos2+zcos**2)
            xcos=xcos/s
            ycos=ycos/s
            zcos=zcos/s
c ---- count reflections and if there are too many, go to next ray.

n=n+1
            if(n.gt.30)then
               write(*,*)'busy Jimmy?!?'
               nrfloss=nrfloss+1
               rtemp=0.0
               do jref=0,n-1
                  rtemp=rtemp+rho**jref
               enddo
               ntot=ntot+n
               refl_tot=refl_tot+rtemp
               RETURN
            endif
            goto 10 end c************************************************************************ subroutine theta_out(xcos,ycos,th_o,k)

if(k.eq.0) then
               th_o= 0.0
            elseif(k.eq.1) then
               dircos= sqrt(xcos**2+ycos**2)
               theta= asin(dircos)
               if(theta.gt.th_o) then
                  th_o= theta
               endif
            endif return
            end c************************************************************************
```

```fortran
c*********************************************************************
        subroutine initialize common/cpc/rentrance,angle,rexit,t
        common/rays/ntarg,nenter,nthrough,nmissed,
     &   ntot,avgn,nrfloss,nreject
        common/input_files/kin
        common/dist/dtarg
        common/reflec/rho,pthrough,refl_thru,refl_tot c ----- initialize counting variables
        ntot=0
        nthrough=0
        nreject=0
        nmissed=0
        refl_thru=0.0
        refl_tot=0.0
        pthrough=0.0
        avgn=0.0
        nrfloss=0 return
        end subroutine coordinates
        common/splinecom/r(0:199),h(0:199),d2r(0:199)
        common/cpc/rentrance,angle,rexit,t open(unit=23, file='coordinates', status='unknown')
        do 100 i=0,199,1
           read(23,*)r(i),h(i)
100     continue
        close(unit=23)

rentrance= r(199)
        rexit= r(0)

return
        end function random(idum)
        parameter(m=714025, ia=1366, ic=150889, rm=1.0/m)
        dimension ir(97)
        data iff /0/
        if(idum.lt.0.or.iff.eq.0) then
           iff=1
           idum=mod(ic-idum,m)
           do 11 j=1,97
              idum=mod(ia*idum+ic,m)
              ir(j)=idum
11         continue
           idum=mod(ia*idum+ic,m)
           iy=idum
        endif
        j=1+(97*iy)/m
        if(j.gt.97.or.j.lt.1)pause'felch!!!'
        iy=ir(j)
        ran2=iy*rm
        idum=mod(ia*idum+ic,m)
        ir(j)=idum
        random=ran2
        return
        end c********************************************************************* subroutine chooseray(idum,x0,y0)
```

```
          n= 1
          do 100 while(n.eq.1)
             x0= 10.0668 - 2.0*10.0668*random(idum)
             y0= 10.0668 - 2.0*10.0668*random(idum)
             r= sqrt(x0*x0+y0*y0)
             if(r.lt.10.0668) then
                n= 2
             endif
100       continue return
          end

*********************************************************************** c***********************************************************************
          subroutine spline(r,h,d2r)
c
c         sets up cubic spline for representation of the CPC wall
c         r is radius array, h is height array, d2r is second derivative array.
c         this routine is only called once, 'splint' is used for interpolation.
c
c            see Numerical recipies ch(3.3) pp. 84-89
c
          dimension r(0:199),h(0:199),d2r(0:199),u(0:199)

dr0=(r(1)-r(0))/(h(1)-h(0))
          dr199=(r(199)-r(198))/(h(199)-h(198))
          if(dr0.gt..99e30)then
             d2r(0)=0
             u(0)=0
          else
             d2r(0)=-.5
             u(0)=(3.0/(h(1)-h(0)))*((r(1)-r(0))/
     +          (h(1)-h(0))-dr0)
          endif
          do 11 i=1,198
             sig=(h(i)-h(i-1))/(h(i+1)-h(i-1))
             p=sig*d2r(i-1)+2.0
             d2r(i)=(sig-1.0)/p
             u(i)=(6.0*((r(i+1)-r(i))/(h(i+1)-h(i))-
     +          (r(i)-r(i-1))/(h(i)-h(i-1)))/
     +          (h(i+1)-h(i-1))-sig*u(i-1))/p
11        continue
          if(dr199.gt..99e30)then
             qn=0
             un=0
          else
             qn=0.5
             un=(3.0/(h(199)-h(198)))*(dr199-(r(199)-r(198))/
     +          (h(199)-h(198)))
          endif
          d2r(199)=(un-qn*u(198))/(qn*d2r(199)+1.0)
          do 12 k=198,0,-1
             d2r(k)=d2r(k)*d2r(k+1)+u(k)
12        continue
          return
          end c***********************************************************************
          subroutine splint(r0,h0,r,h,d2r)
c
c         subroutine which returns r0 at height h0 dimension r(0:199),h(0:199),d2r(0:199)
          parameter (xsmall=1e-5)

klo=0
          khi=199
```

```
1       if(khi-klo.gt.1)then
          k=int((khi+klo)/2)
          if(h(k).gt.h0)then
            khi=k
          else
            klo=k
          endif
          goto 1
        endif
        hh=h(khi)-h(klo)
        if(hh.lt.(10*xsmall))pause'bad height input, too small'
        if(hh.gt.h(199)) pause'bad height input, too big'
        a=(h(khi)-h0)/hh
        b=(h0-h(klo))/hh c ****  r0 has at one time caused a numeric overflow, for out of range cases
        r0=a*r(klo)+b*r(khi)
        r1=(a**3-a)
        r1=r1*d2r(klo)+(b**3-b)*d2r(khi)
        r0=r0 + (r1)*(hh**2)/6.0 return
        end c****************************************************************************
        subroutine derivative
c
c    derivative returns dr the derivitive, dr/dz. so that at hmax, dr/dz=0.
c
        common/splinecom/r(0:199),h(0:199),d2r(0:199)
        common/der/dr(0:199),d3r(0:199)

do 100 i=0,198,1
          dr(i)= (r(i+1)-r(i))/(h(i+1)-h(i))
100     continue
        dr(199)= dr(198)

open(unit=34, file='dzdr', status='unknown')
        write(34,*)'z             dzdr'
        do 200 i=1,199,1
          write(34,*)h(i),1.0/dr(i)
200     continue
        close(unit=34)

return
        end c**************************************************************************** program coordinates
          dimension phi(1:200), theta(1:200), r(1:200), d2theta0(1:200)
        dimension phi0(1:200), theta0(1:200), d2theta(1:200)
        dimension xx(1:200), zz(1:200)
        real k1, k2, k3, k4
        parameter (degtorad=3.1415926535/180.0)

write(*,*)'Enter source length.'
        read(*,*)a
        write(*,*)'Enter maximum theta.'
        read(*,*)thetamax
        thetamax= thetamax*degtorad
        write(*,*)'Enter minimum theta.'
        read(*,*)thetamin
        thetamin= thetamin*degtorad c    FIND PHI AS A FUNCTION OF THETA
        phi0(1)= 90.0*degtorad
        do 200 i=1,199,1
          h= (thetamax-thetamin)/200.0
```

```
            theta0(i)= ((thetamax-thetamin)*float(i-1)/199.0)+thetamin
            k1= h*g(phi0(i),theta0(i))
            k2= h*g(phi0(i)+0.5*k1,theta0(i)+0.5*h)
            k3= h*g(phi0(i)+0.5*k2,theta0(i)+0.5*h)
            k4= h*g(phi0(i)+k3,theta0(i)+h)
            phi0(i+1)= phi0(i) + (k1/6.0) + (k2/3.0) + (k3/3.0) +
     +                  (k4/6.0)
 200    continue
        theta0(200)= thetamax
        call spline(theta0,phi0,d2theta0)

c   FIND THETA AS A FUNCTION OF PHI
        phimin= phi0(1)
        phimax= phi0(200)
        do 250 i=1,200,1
            phi(i)= ((phimax-phimin)*float(i-1)/199.0)+phimin
            call splint(theta(i),phi(i),theta0,phi0,d2theta0)
 250    continue call spline(theta,phi,d2theta)

c   FIND R AS A FUNCTION OF PHI
        f= alog(a)
        h= (phimax-phimin)/200.0
        do 300 i=1,200,1
            theta1= theta(i)
            k1= h*tan(0.5*(theta1+phi(i)))
            call splint(theta2,0.5*h+phi(i),theta,phi,d2theta)
            k2= h*tan(0.5*(theta2+0.5*h+phi(i)))
            theta3= theta2
            k3= h*tan(0.5*(theta3+0.5*h+phi(i)))
            call splint(theta4,h+phi(i),theta,phi,d2theta)
            k4= h*tan(0.5*(theta4+h+phi(i)))
            f= f + (k1/6.0) + (k2/3.0) + (k3/3.0) + (k4/6.0)
            r(i)= exp(f)
 300    continue open(unit=8, file='points', status='unknown')
        write(8,*)'phi        theta       r'
        do 350 i=1,200,1 write(8,*)phi(i)/degtorad,theta(i)/degtorad,r(i)
 350    continue
        close(unit=8)

do 400 i=1,200,1
            xx(i)= r(i)*cos(phi(i)-90.0*degtorad)
            zz(i)= r(i)*sin(phi(i)-90.0*degtorad)
 400    continue c   GRAPH USING POSTSCRIPT write(*,*)'Enter magnification factor.'
        read(*,*)f
        write(*,*)'Enter vertical translation factor.'
        read(*,*)fact
        dis= fact*zz(200)
        open(unit=7, file='samjones', status='unknown')

write(7,*)'newpath'
        write(7,*)'306 ','72 ','translate'
        write(7,*)0,' ',nint(f*dis),' moveto'
        write(7,*)nint(f*a),' ',nint(f*dis),' lineto'
        do 500 i=1,200,1
            write(7,*)nint(f*xx(i)),' ',nint(f*(zz(i)+dis)),
     &                 ' lineto'
 500    continue write(7,*)'stroke showpage'
        close(unit=7)
```

```
      open(unit=23, file='coordinates', status='unknown')
      do 600 i=1,200,1
         write(23,*)xx(i)-0.5*a,zz(i)
600   continue
      close(unit=23)

stop
      end c**************************************************************** function g(phi,theta)

x= sin(phi+theta-0.5*3.1415926535)
      y= 3.0*tan(theta)*cos(phi+theta-0.5*3.1415926535)
      g= x+y return
      end
```

I claim:

1. A nonimaging illumination optical device for producing a selected far field illuminance output $I(\theta)$ over an angular range $\theta$, comprising:

a source of light having a surface and a characteristic luminance $L(\theta)$ and related to said selected far field illuminance output $I(\theta)$ by the expression:

$$L(\theta_i)R_i \sin(\phi_i-\theta_i)Q(\theta_i)=I(\theta_i) \quad (A)$$

where $R_i$ is a radius vector from a point within said source of light, $\phi_i$ is an angle between said radius vector and a direction 180° from direct forward illumination output from said nonimaging illumination optical device, $\theta_i$ is an angle between direct forward illumination and light rays reflected once from a light reflecting surface having an aperture opening and a spatial position and also disposed at least partially around said light source and said light source disposed opposite the aperature opening of said light reflecting surface and $G(\theta_i)$ is a geometrical factor that is a function of the geometry of said light source; and the spatial position of said light reflecting surface for producing said selected far field illuminance output $I(\theta_i)$ being defined in terms of said $R_i$, $\phi_i$ and $\theta_i$ and said $R_i$ functionally describing a profile for said spatial position of said light reflecting surface and varying as a function of said angle $\phi_i$ in accordance with the expression:

$$R_i=(\text{const.})\exp\{\int \tan[(\phi_i-\theta_i)/2]d\phi_i\} \quad (b)$$

and said light reflecting surface satisfying equations (a) and (b) simultaneously.

2. The nonimaging optical device as defined in claim 1 where said $\theta_i$ can range from a positive to a negative angle.

3. A nonimaging illumination optical device for producing a selected far field illuminates output $I(\theta)$ over an angular range $\theta$, comprising:

a source of light having a characteristic luminance $L(\theta_i)$ and related to said $I(\theta)$ by the expression:

$$L(\theta_i)R_i \sin(\phi_i-\theta_i)\cos^{11}\theta_i=I(\theta_i) \quad (a)$$

where $R_i$ is a radius vector from a point within said source of light, $\phi_i$ is an angle between said radius vector and a direction 180° from direct forward illumination output from said device, n is a number determined by the geometry of said light source and $\theta_i$ is an angle between direct forward illumination and light rays reflected once from a light reflecting surface having an aperature opening and a spatial position and also positioned at least partially around said light source and said light source disposed opposite the aperature opening of said light reflecting surface; and the spatial position of said light reflecting surface for producing said selected far field illuminance output $I(\theta_i)$ being defined in terms of said $R_i$, $\phi_i$, and $\theta_i$ and said $R_i$ functionally describing a profile for said spatial position of said light reflecting surface varying as a function of said angle $\phi_i$ in accordance with the expression:

$$R_i=(\text{const.})\exp\{\int \tan[(\phi_i-\theta_i)/2]d\phi_i\} \quad (b)$$

and said light reflecting surface satisfying equations (a) and (b) simultaneously.

4. The nonimaging illumination optical device as defined in claim 3 wherein said "n" exponent is 2 for two dimensional light source solutions and is greater than two for three dimensional light source solutions.

5. The nonimaging optical device as defined in claim 3 where said n is almost 2.1 for three dimensional sources.

6. The nonimaging illumination optical device as defined in claim 3 wherein said selected far field illuminance output $I(\theta)$ comprises a substantially constant illuminance over said angular range $\theta$.

7. The nonimaging illumination optical device as defined in claim 3 wherein said selected far field illuminance $I(\theta_i)$ is a constant and said light reflecting surface is described in accordance with the expression:

$$d\psi_i/d\theta_i=1+\sin\psi_i-n\tan(\theta_i)\cos\psi_i$$

where $\psi_i = \phi_i - \theta_i - \pi/2$.

8. The nonimaging illumination optical device as defined in claim 3 wherein said $I(\theta_i) = A \exp(B\theta_i)$ for two-dimensional light source solutions where A and B are constants and said light reflecting surface is described in accordance with the expression:

$$d\psi/d\theta_i = 1 + \sin\psi_i - 2\tan(\theta_i)\cos\psi_i + B;$$

where $\psi_i = \phi_i - \theta_i = \pi/2$

9. The nonimaging illumination optical device as defined in claim 3 wherein said selected far field illuminance $I(\theta_i) = A \exp(-B\theta_i^2/2)$ for two-dimensional light source solutions and Gaussian illuminance and A and B are constants and said light reflecting surface is described in accordance with the expression:

$$d\psi_i/d\theta_i = 1 + \sin\psi_i - 2\tan(\theta_i)\cos\psi_i - B\theta_i$$

10. A nonimaging illumination optical device for producing a selected far field illuminance output $I(\theta)$ over an angular range $\theta$, comprising:

a light reflecting surface having an aperature opening and a spatial position and also a light source having a surface and disposed opposite the aperature opening of said light reflecting surface, said light source having a characteristic luminance $L(\theta_i)$ and related to said selected far field illuminance output $I(\theta)$ by the expression:

$$L(\theta_i)R_i \sin(\phi_i - \theta_i)G(\theta_i) = I(\theta_i) \quad (a)$$

where $R_i$ is a radius vector from a point within said light source, $\phi_1$ is an angle between said radius vector and a direction 180° from direct forward illumination output from said nonimaging illumination optical device, $\theta_i$ is an angle between direct forward illumination and light rays reflected once from said light reflecting surface and $G(\theta_i)$ is a geometrical factor that depends on the geometry of said light source; and the spatial position of said light reflecting surface for producing said selected far field illuminance output $I(\theta_i)$ being defined in terms of said $R_i$, $\psi_i$ and $\theta_i$ and said $R_i$ functionally describing a profile for said spatial position of said light reflecting surface and varying as a function of said angle $\phi_i$ in accordance with the expression:

$$R_i = (\text{const.}) \exp\{\int \tan[(\phi_i - \theta_i)/2]d\phi_i\} \quad (b)$$

with said light reflecting surface satisfying equations (a) and (b) simultaneously.

11. The nonimaging optical device as defined in claim 10 wherein said $\theta_i$ can range from a positive to a negative angle.

* * * * *